United States Patent
Seven et al.

(10) Patent No.: US 7,435,435 B2
(45) Date of Patent: Oct. 14, 2008

(54) FROZEN ICE CONFECTION

(75) Inventors: Jean-Marc Maurice Seven, Rueil Malmaison (FR); Susan Todd, Rome (IT); Deborah Jane Towell, Bedford (GB)

(73) Assignee: Good Humor - Breyers Ice Cream, division of Conopco, Inc., Green Bay, WI (US)

( * ) Notice: Subject to any disclaimer, the term of this patent is extended or adjusted under 35 U.S.C. 154(b) by 281 days.

(21) Appl. No.: 10/402,086

(22) Filed: Mar. 28, 2003

(65) Prior Publication Data

US 2003/0228398 A1 Dec. 11, 2003

(30) Foreign Application Priority Data

Mar. 28, 2002 (EP) ................... 02252322

(51) Int. Cl.
*A23G 9/00* (2006.01)
*A23G 9/32* (2006.01)
*A23G 9/44* (2006.01)

(52) U.S. Cl. ................. 426/100; 426/101; 426/565

(58) Field of Classification Search ............... 426/100, 426/101, 565, 601, 607, 660
See application file for complete search history.

(56) References Cited

U.S. PATENT DOCUMENTS

| | | | |
|---|---|---|---|
| 3,582,357 A | 6/1971 | Katz | |
| 4,031,261 A | 6/1977 | Durst | |
| 4,310,559 A | 1/1982 | Mita et al. | |
| 4,394,392 A * | 7/1983 | Tresser | 426/101 |
| 4,724,153 A | 2/1988 | Dulin et al. | |
| 4,826,656 A | 5/1989 | Huber et al. | |
| 4,832,976 A * | 5/1989 | Griffin et al. | 426/660 |
| 5,126,156 A | 6/1992 | Jones | |
| 5,215,777 A | 6/1993 | Asher et al. | |
| 5,246,725 A | 9/1993 | Fisher et al. | |
| 5,698,247 A | 12/1997 | Hall | |
| 6,187,365 B1 | 2/2001 | Vaghela et al. | |
| 6,737,098 B1 * | 5/2004 | Devine et al. | 426/576 |
| 6,777,017 B2 * | 8/2004 | Porter et al. | 426/590 |

FOREIGN PATENT DOCUMENTS

| | | |
|---|---|---|
| EP | 0 508 529 | 6/1996 |
| EP | 1 075 794 | 2/2001 |
| GB | 2 288 965 | 11/1995 |
| WO | 93/21779 | 11/1993 |
| WO | 96/29896 | 10/1996 |
| WO | 97/04663 | 2/1997 |
| WO | WO 9745022 | 12/1997 |
| WO | WO 98/47390 | 10/1998 |
| WO | WO 01/06865 | 2/2001 |
| WO | WO 01/50879 | 7/2001 |
| WO | WO 01/68565 | 9/2001 |

OTHER PUBLICATIONS

"The Carob" http://web.archive.org/web/20010314112702/http://www.balesa.com/pag2a.html, Sep. 14, 2001.*
Desrosier, Elements of Food Technology, 1977, pp. 453-455.*
European Search Report claiming priority on Application No. EP 03 25 dated Jul. 9, 2003.
European Search Report claiming priority on Application No. EP 02 25 2322 dated Aug. 8, 2003.
Arbuckle et al., Chapter 6, 5th Edition, *Stabilizers and Emulsifiers*, pp. 71-80 (1996).
Hackh's Chemical Dictionary, 1969, McGraw-Hill, Inc., p. 135 (definition of carob beans) and p. 394 (definition of locust bean).
The Condensed Chemical Dictionary, 8th Ed., Van Nostrand Reinhold Company, 1971, p. 173 (definition of carob-seed gum).

* cited by examiner

*Primary Examiner*—Arthur L Corbin
(74) *Attorney, Agent, or Firm*—Gerard J. McGowan, Jr.

(57) ABSTRACT

The invention relates to a frozen ice confection comprising ice granules, wherein the confection has a total solids content of from 4% to 10% by weight and comprising fat and emulsifier in a total amount of from 0.3% to 1.5% by weight. The invention further provides a pre-mix for the preparation of the ice confection.

5 Claims, No Drawings

FROZEN ICE CONFECTION

FIELD OF INVENTION

The present invention relates to a frozen ice confection comprising ice granules and to a pre-mix for its preparation. More particularly, the invention relates to a free-flowing particulate frozen ice confection.

BACKGROUND TO THE INVENTION

The development of improved ice confections in particulate form is of considerable commercial interest. Frozen ice confections comprising flavoured ice granules, for example, which are both refreshing to the consumer and have an aesthetically pleasing appearance, are particularly desirable and are commercially available.

A disadvantage associated with ice confections containing ice granules is that, on frozen storage, the individual granules tend to stick or clump together, forming a hardened product. Not only does this adversely affect the eating sensation experienced by the consumer but it also has a detrimental effect on the industrial processability of the product as the resulting clumped product can be difficult to handle, particularly with regard to portioning or dosing.

Various approaches to the problem of overcoming the effects of clumping in frozen particulate ice products have been proposed in the art. These may be conveniently be divided into methods for dealing with the clumping once it has occurred and methods for preventing clumping occurring in the first place.

Warming up the product from the frozen storage temperature to a higher temperature for a period of time can help to make the product more free flowing but this is generally undesirable where the product is intended for consumption from frozen as the changes in temperature can lead to problems with microbiological contamination.

Alternatively, by controlling the temperature at which the ice granules in the frozen confection are prepared, it has been found that the problem of the granules adhering to each other can be reduced. U.S. Pat. No. 5,126,156, for example, describes a method for preparing a free-flowing, frozen dairy product in which beads of product are prepared by dripping the formulation into a freezing chamber and are then stored at a temperature between −30° F. and −40° F. (−34° C. to −40° C.). In U.S. Pat. No.5,698,247, it is disclosed that if the temperature is maintained at −10° C. or below during the manufacturing process (and furthermore if the granules are manufactured to be approximately spherical in shape) then ice granules in a water-ice product can be prevented from sticking together.

Coating of individual ice granules with a coating suitable for consumption (such as a fat, a mixture of fats and mono- and/or diglycerides or fibrous products such as carbohydrate polymers and natural polysaccharides) in order to give improved processability is described in EP-A-1 075 794.

An alternative approach is described in U.S. Pat. No. 4,310, 559. Here, adhesion of ice granules resulting from melting of the surface as the ice blocks are crushed to produce the granules may be prevented by contacting the granules with a refrigerant for an extremely short period of time prior to sifting.

The existing approaches to overcoming the problem of ice granule clumping require complicated additional process steps or sophisticated process controls, leading to increased costs. Techniques involving coating the surface of the granules can have adverse effects on the final product eating quality. There remains therefore a continuing need for an improved method for the preparation of free flowing frozen ice confections comprising ice granules.

Tests and Definitions

Particle Size

Metal sieves in the range 0 to 9.5 mm were used to measure the frozen particle size. The sieves were placed together in sequence (smallest to highest) to form a tower and cooled to −25° C. A sample of frozen particles (100-200 g) is placed on the top sieve (9.5 mm). The stack of sieves was shaken for 1 minute to ensure good separation. Each sieve was then weighed and the % weight of frozen particles in each size class was calculated.

Total Solids

A known weight of liquid material is placed on the heat balance. The sample is heated until there is no change in mass and the % TS calculated.

SUMMARY OF THE INVENTION

The present invention provides a frozen ice confection comprising ice particles, said confection having a total solids content of from 4% to 10% by weight and comprising fat and emulsifier in a total amount of from 0.3 % to 1.5% by weight.

The invention further provides a pre-mix for a liquid composition used in preparing a frozen ice confection according to the invention comprising a total solids content of from 4% to 10% by weight and including fat and emulsifier in a total amount of from 0.3% to 1.5% by weight.

DETAILED DESCRIPTION OF THE INVENTION

The invention is based on the finding that by incorporating a total of from 0.3% to 1.5% by weight of fat and emulsifier into the composition from which the ice granules are formed, an improved frozen ice confection is obtained. By means of the invention, free-flowing, low solids containing frozen ice granule compositions are provided in which the individual ice granules do not adhere together on storage. Not only does this afford the consumer an improved eating experience but it also simplifies considerably the manufacturing and handling of the frozen confection on an industrial scale.

Incorporating fats into frozen flavoured ice confections would generally be considered undesirable as it would be expected to adversely affect the taste properties. Furthermore, there is nothing in the literature to suggest that this would be effective in leading to improved flowability of the granules.

In WO 97/04663, individual water-ice bodies containing inter alia up to 5% by weight of fat are disclosed. It is stated that these water-ice bodies do not tend to stick together during storage at freezing temperatures. There is no suggestion that this property is attributable to the presence of the fat in the formulation and indeed in the example given in the text, there is no fat or emulsifier present. The composition exemplified also has a considerably higher solids content than in the compositions of the present invention so this would tend to result in sintering due to a higher proportion of unfrozen matrix.

Free-flowing ice granules comprising emulsifier and fat (although at considerably higher levels than in the present invention) are exemplified in WO 93/21779. Again, there is no suggestion that this effect is attributable to the presence of fat and emulsifier. Indeed, WO 93/21779 contains examples of other compositions where granules comprising fat and emulsifier sinter together to a mass on storage at freezing temperatures.

The present inventors have surprisingly found that by introducing a controlled level of fat in conjunction with emulsifier into the composition from which the ice granules are formed, it is possible to obtain a product with improved granule flow properties but which still has acceptable taste to the consumer. This improvement is unexpectedly greater than that achieved by increasing the amounts of either fat or emulsifier separately.

Ice granules in the frozen confection according to the invention have a particle size distribution according to which at least 80% by weight of said ice granules have a particle size of between 2 and 9.5 mm, preferably at least 90%, most preferably at least 99%. Granules of such dimension can conveniently be prepared in a continuous process. It will be understood that for spherical granules, this largest dimension will be the diameter. Granules for use according to the invention are suitably substantially spherical, particularly in frozen droplet form.

As used herein, the term 'total solids content' is intended to refer to the components other than water in the frozen composition. It will be appreciated that the choice of components will depend on the desired characteristics of the confection product. Typically, this composition comprises fats, emulsifiers, stabilizers, flavourings, acidifiers, colours and sugars. Preferred confections according to the invention comprise solids in an amount of from 5% to 8% by weight.

The fat may be any fat of animal or vegetable origin conventionally used in the art. Suitably, the fat may be coconut oil, butteroil, olive oil, sunflower oil, corn oil or mixtures thereof. Preferred fats for use according to the invention are coconut oil or butteroil. The fat may be present in the confection according to the invention in an amount of from 0.3% to 1.5% by weight, preferably from 0.5% to 1.2% by weight. The upper limit of the fat range in the present invention reflects the balance between improving the flowability of the product without having a detrimental effect on taste properties. Above the claimed range, taste is adversely affected.

Emulsifiers for use according to the invention include those conventional in the art. Suitable emulsifiers include saturated or unsaturated mono-diglycerides where total monoglyceride level is up to 60% and are sourced from either palm, soya sunflower or canola. Preferably, the emulsifier is a saturated mono-diglyceride emulsifier and is sourced from palm or soya. Typically, the emulsifier is present in an amount of from 0.2 to 1.5% by weight, preferably from 0.3% to 1.2% by weight.

The total amount of fat and emulsifier according to the invention should not exceed 1.5% by weight. Preferably the fat component is present in a greater proportion than the emulsifier component. In a preferred embodiment, the fat is present in an amount of from 0.4 to 1.2% by weight and the emulsifier in an amount of from 0.2 to 0.8% by weight. Granules for use according to the invention are conveniently formed by dropping the liquid composition from which the granules are to be formed into a temperature-controlled environment in which the liquid mix freezes (see, for example, the method of U.S. Pat. No. 5,126,156). Preferably, the cooling is effected using liquid nitrogen.

The invention is further illustrated by means of the following examples which are provided by way of illustration only.

EXAMPLES

Compositions having the formulations given in Tables 1 and 2 were prepared according to the following process steps:

Mix process: All dry ingredients with the exception of the acidifier mixed together were added to water which was preheated to 80° C., followed by stirring for 5 minutes. Then all the liquid ingredients and acidifier were added, stirred for 1 minute, pasteurised at 82° C. for 33 seconds, homogenised at 150-170 Bar pressure and cooled to 5° C. until required.

Granule formation: The liquid mix at 5° C. was loaded into a mix holding chamber of 5 liters capacity which fed directly into a dripping nozzle of 1 mm internal diameter. The liquid drops in turn fell into liquid nitrogen where they were rapidly frozen into approximately spherical balls. From here they were filled into a cylindrical type cup (height 95 cm, bottom outside diameter 63 mm, top outside diameter 46 mm) to a fill weight of 85 g, from the base, the base being sealed on with an iron. The products were then placed at −25° C. until required for measurement.

Notes pertaining to Tables 1 and 2 are as follows:
(I)=any combination of citric and malic acid
(II)=Quest IC9437, containing Carrageenan and Pectin
(III)=Quest Admul MG 4004 a saturated mono-diglyceride
(IV)=A 1:1 blend of Acesulfame and Aspartame
(V)=Any typically used water ice flavouring: level shown is an example
(VI)=Any typically used water ice colouring: level shown is an example
(VII)=Refined coconut oil TS indicates the total solids content as a percentage by weight TF indicates the total fat content (including emulsifier) as a percentage by weight.

The determination of these values is conventional in the art.

TABLE 1

Recipes for Examples 1-4

| Ingredient/% | Example 1 | Example 2 | Example 3 | Example 4 |
|---|---|---|---|---|
| Fructose solids | 4.86 | 4.06 | 4.06 | 3.86 |
| Acidifier (I) | 0.7 | 0.7 | 0.7 | 0.7 |
| Salt | 0.09 | 0.09 | 0.09 | 0.09 |
| Stabiliser (II) | 0.6 | 0.6 | 0.6 | 0.6 |
| Emulsifier (III) | 0.2 | 0.2 | 1.0 | 0.4 |
| Milk Protein | 0.0875 | 0.0875 | 0.0875 | 0.0875 |
| Artificial Sweeteners (IV) | 0.036 | 0.036 | 0.036 | 0.036 |
| Flavour (V) | 0.17 | 0.17 | 0.17 | 0.17 |
| Colour (VI) | 0.03 | 0.03 | 0.03 | 0.03 |
| Fat (VII) | 0 | 0.8 | 0.0 | 0.8 |
| Water | To 100 | To 100 | To 100 | To 100 |
| TS | 6.8 | 6.8 | 6.8 | 6.8 |
| TF | 0.2 | 1.0 | 1.0 | 1.2 |

TABLE 2

Recipes for Examples 5-6

| Ingredient/% | Example 5a | Example 5b | Example 6a | Example 6b |
|---|---|---|---|---|
| Fructose solids | 10.0 | 9.0 | 1.8 | 0.8 |
| Acidifier (I) | 0.7 | 0.7 | 0.7 | 0.7 |
| Salt | 0.09 | 0.09 | 0.09 | 0.09 |
| Stabiliser (II) | 0.6 | 0.6 | 0.6 | 0.6 |
| Emulsifier (III) | 0.2 | 0.4 | 0.2 | 0.4 |
| Milk Protein | 0.0875 | 0.0875 | 0.0875 | 0.0875 |
| Artificial Sweeteners (IV) | 0.036 | 0.036 | 0.036 | 0.036 |
| Flavour (V) | 0.17 | 0.17 | 0.17 | 0.17 |
| Colour (VI) | 0.03 | 0.03 | 0.03 | 0.03 |
| Fat (VII) | 0 | 0.8 | 0 | 0.8 |
| Water | To 100 | To 100 | To 100 | To 100 |
| TS | 11.9 | 11.9 | 3.7 | 3.7 |
| TF | 0.2 | 1.2 | 1.0 | 1.0 |

Free flow test: Samples in a pot are squeezed (six replicates) manually at −25° C., the pot is then opened and upturned and the flow properties of the contents assessed on a 5 point scale according to which:
1=granules exit pot and are completely free flowing.
2=if granules do not exit at 1, pot is re-closed and inverted 5 times to separate the granules, which exit when lid is reopened and upturned.
3=as 2 but two gentle squeezes to the sides are additionally required before granules will exit. No residual deformation of the pack is seen.
4=as 3 but two harder squeezes are required which will deform the pack, leaving it still deformed after the granules are removed.
5=granules cannot be made to exit.

A squeeze score of 3 is considered the maximum in terms of acceptable flowability. The scores quoted in Tables 2 and 3 are mean values of the scores obtained for six replicate samples. The test is performed with respect to time, sampling every few days.

TABLE 3

Squeeze Data for Examples 1-4

| Time/Days | Example 1 Squeeze Value | Example 2 Squeeze Value | Example 3 Squeeze Value | Example 4 Squeeze Value |
|---|---|---|---|---|
| 1 | 2 | 1.5 | 1 | 1 |
| 2 | 2 | 1.5 | 1.5 | 1.5 |
| 3 | 2 | 2 | 1.5 | 1.5 |
| 4 | 2 | 2 | 1.5 | 1.5 |
| 5 | 3 | 2 | 2 | 1.5 |
| 6 | 3 | 2 | 2 | 1.5 |
| 7 | 3 | 2 | 2.5 | 1.5 |
| 8 | 3 | 2 | 2.5 | 1.5 |
| 9 | 3 | 2 | 2.5 | 1.5 |
| 10 | 3 | 2 | 2.5 | 1.5 |
| 17 | 4 | 2 | 3 | 1.5 |
| 22 | 4 | 2 | 2.5 | 1.5 |

TABLE 4

Squeeze Data for Examples 5-6

| Time/Days | Example 5a Squeeze Value | Example 5b Squeeze Value | Example 6a Squeeze Value | Example 6b Squeeze Value |
|---|---|---|---|---|
| 1 | 2 | 1 | 1 | 1 |
| 2 | 2 | 1 | 3 | 2 |
| 3 | 2 | 2 | 3 | 3 |
| 4 | 2 | 2 | 3 | 3 |
| 5 | 3 | 2 | 3 | 3 |
| 6 | 3 | 2 | 3 | 3 |
| 7 | 3 | 2 | 3 | 3 |
| 8 | 3 | 2 | 3 | 3 |
| 9 | 3 | 2 | 3 | 3 |
| 10 | 3 | 3 | 3 | 3 |
| 17 | 3 | 3 | 3 | 3 |
| 22 | 3 | 3 | 3 | 3 |

Example 1 is a control example, with a composition that does not fall within the scope of the invention. It has no added fat and a total content of emulsifier+ fat that is below the range defined in the invention. After 5 days the sample is at the acceptable limit of flowability and after 22 is completely unacceptable.

Example 2

0.8% fat has been added to the recipe, and fructose solids reduced to keep the Total Solids the same as the control. Sample is free flowing throughout the test.

Example 3

0.8% emulsifier has been added to the recipe, and fructose solids reduced to keep the Total Solids the same as the control. Sample has improved free flow over the control up to day 6, and thereafter tends to the maximum acceptable level, without going over it throughout the test. Compared to Example 2, however, the flowability is less good.

Example 4

0.2% emulsifier and 0.8% fat are added to the recipe, and fructose solids reduced to keep the Total Solids the same as the control. Sample is free flowing throughout the test, with the flowability being better than that of any of Examples 1-3.

Example 5

In this example significantly higher Total Solids mixes were used to illustrate the effect of fat and emulsifier addition on free flow in this situation. The composition has a total solid content outside the upper limit specified for the invention. As the TS were different to Example 1, a new control was used (example 5a). Example 5b (ie with fat/emulsifier) does show an improvement with respect to its control (example 5a) but the effect is very small.

Example 6

In this example significantly lower Total Solids mixes were used to illustrate the effect of fat and emulsifier addition on free flow in this situation. The composition has a total solid content outside the lower limit specified for the invention. As the TS was different to Example 1, a new control was used (example 6a). Example 6b (ie with fat/emulsifier) shows no improvement with respect to its control (example 6a) and so it is clear that addition of fat and emulsifer has no effect when TS is lowered from 6.8 to 3.7, even though proportionately more fat/emulsifier is present.

The invention claimed is:

1. A free flowing particulate frozen ice confection comprising ice granules, said free flowing particulate frozen ice confection having a total solids content of from 4% to 10% by weight and comprising fat and a saturated or unsaturated mono-diglyceride emulsifier in a total amount of from 0.3% to 1.5% by weight, wherein the emulsifier is present in an amount of from 0.3 to 1.2 wt %.

2. A frozen ice confection according to claim 1 wherein at least 80% by weight of the ice granules have a particle size of between 2 and 9.5 mm.

3. A frozen confection according to claim 1 having a total solids content of from 4% to 8% by weight.

4. A frozen confection according to claim 1 wherein the fat is present in an amount of from 0.4% to 1.2% by weight and the emulsifier in an amount of from 0.2% to 0.8% by weight.

5. A frozen confection according to claim 1 wherein the fat is coconut oil or butter oil.

* * * * *